(12) United States Patent
Stegmann et al.

(10) Patent No.: US 7,565,376 B2
(45) Date of Patent: Jul. 21, 2009

(54) DYNAMIC ASSESSMENT AND PERSISTENCE OF OBJECT INSTANCES

(75) Inventors: Volkmar Stegmann, Altlussheim (DE); Gerd M. Ritter, Heidelberg (DE)

(73) Assignee: SAP AG, Walldorf (DE)

( * ) Notice: Subject to any disclaimer, the term of this patent is extended or adjusted under 35 U.S.C. 154(b) by 230 days.

(21) Appl. No.: 11/615,100

(22) Filed: Dec. 22, 2006

(65) Prior Publication Data

US 2008/0154948 A1    Jun. 26, 2008

(51) Int. Cl.
*G06F 17/30* (2006.01)
(52) U.S. Cl. .................................. 707/103 R; 717/140
(58) Field of Classification Search ................ 707/100, 707/103 R–103 Z; 717/140
See application file for complete search history.

(56) References Cited

U.S. PATENT DOCUMENTS

| | | | | |
|---|---|---|---|---|
| 5,809,509 A | * | 9/1998 | Blackman et al. | 707/103 R |
| 5,848,419 A | * | 12/1998 | Hapner et al. | 707/103 R |
| 5,983,235 A | * | 11/1999 | Blackman et al. | 707/103 R |
| 6,591,277 B2 | * | 7/2003 | Spence et al. | 707/103 R |
| 6,658,425 B1 | * | 12/2003 | Sluiman | 707/103 R |
| 7,356,546 B2 | * | 4/2008 | Venkatesh et al. | 707/103 R |
| 2006/0059033 A1 | | 3/2006 | Wagner et al. | |

* cited by examiner

*Primary Examiner*—Cheryl Lewis
(74) *Attorney, Agent, or Firm*—Fish & Richardson P.C.

(57) ABSTRACT

In a computing system, an operation is performed on an instance of a data object. One of several persistence models that are available for the data object is identified for the instance using the performed operation, where each of the several persistence models defines how the data object is to be persisted in a database. The instance is stored in the database according to the identified persistence model. The persistence model may be identified at run time in a manner transparent to a user. A first persistence model may be identified for a first instance of the data object and a second persistence model, different from the first persistence model, may be identified for a second instance of the data object. An object instance may later be stored according to another persistence model.

19 Claims, 10 Drawing Sheets

DYNAMIC ASSESSMENT AND PERSISTENCE OF OBJECT INSTANCES

TECHNICAL FIELD

This document relates to assessing and storing an instance of a data object.

BACKGROUND

Electronic storage of business information has become ubiquitous in today's business environment. As computer systems and networks that connect the computer systems have evolved to make communication of electronic information safer, more accepted, and generally more feasible for conducting day-to-day business or personal activities, businesses, customers, individuals have increasingly come to rely on storage of such communication or other electronic information. Because myriad types of information may today be stored electronically, including important or frequently-accessed information, being able to efficiently store, locate and process such information is extremely important. However, not all information that is stored electronically is of high importance. In a typical day, a business or an individual may send, receive, or process many different types of electronic information, some of which may be extremely important, complex, or expected to be frequently used in the future, and others of which may be simpler, not as important, or not expected to have the same functionality requirements. Sometimes, information of the two types may share a common characteristic, such as both being an email, for example.

Databases are frequently used to store large amounts of electronic information. Databases can be used to store data objects that contain information, and can store the data objects according to different storage methodologies. One storage methodology may be suited for better system performance, but may achieve the better performance by sacrificing in the area of functionality. Conversely, another storage methodology may be suited for expanded functionality, but may do so at the expense of system performance. One example of a database storage system stores all instances of a given data object according to the same storage methodology. The process for selecting the storage methodology is statically defined, such that an object is identified, a corresponding storage methodology is identified based on the object, and all instances of the object are stored in the database according to the corresponding storage methodology.

SUMMARY

This document relates to assessing and storing an instance of a data object according to a selected persistence model.

In a first general aspect, a method includes performing an operation on an instance of a data object. The method also includes identifying for the instance one of several persistence models that are available for the data object using the performed operation, where each of the several persistence models defines how the data object is to be persisted in a database. The method further includes storing the instance in the database according to the identified persistence model.

In selected embodiments, a first persistence model may be identified for a first instance of the data object and a second persistence model, different from the first persistence model, may be identified for a second instance of the data object. The first persistence model may define that the first instance of the data object be stored in one table in the database, and the second persistence model may define that the second instance of the data object be stored in a plurality of tables in the database.

In selected embodiments, the persistence model may be identified at run time. The instance may be later stored according to another persistence model. The identification of the one of several persistence models may occur transparent to a user. Identifying the one of several persistence models using the performed operation may include determining an expectation of required functionality for the instance of the data object. The expectation of required functionality may be determined by examining data in a table of the instance of the data object. The persistence model may be a data object, and the data object may be an email.

In a second general aspect, a computer program product tangibly embodied in an information carrier includes instructions that when executed by a processor perform a method for persisting an instance of a data object. The method includes performing an operation on an instance of a data object. The method also includes identifying for the instance one of several persistence models that are available for the data object using the performed operation, each of the several persistence models defining how the data object is to be persisted in a database. The method further includes storing the instance in the database according to the identified persistence model.

Advantages of the systems and techniques described herein may include any or all of the following: Improved storage flexibility, improved throughput, improved access time, reduced memory consumption, reduced resource blocking, added functionality, targeted resource apportionment, and better use of system resources.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
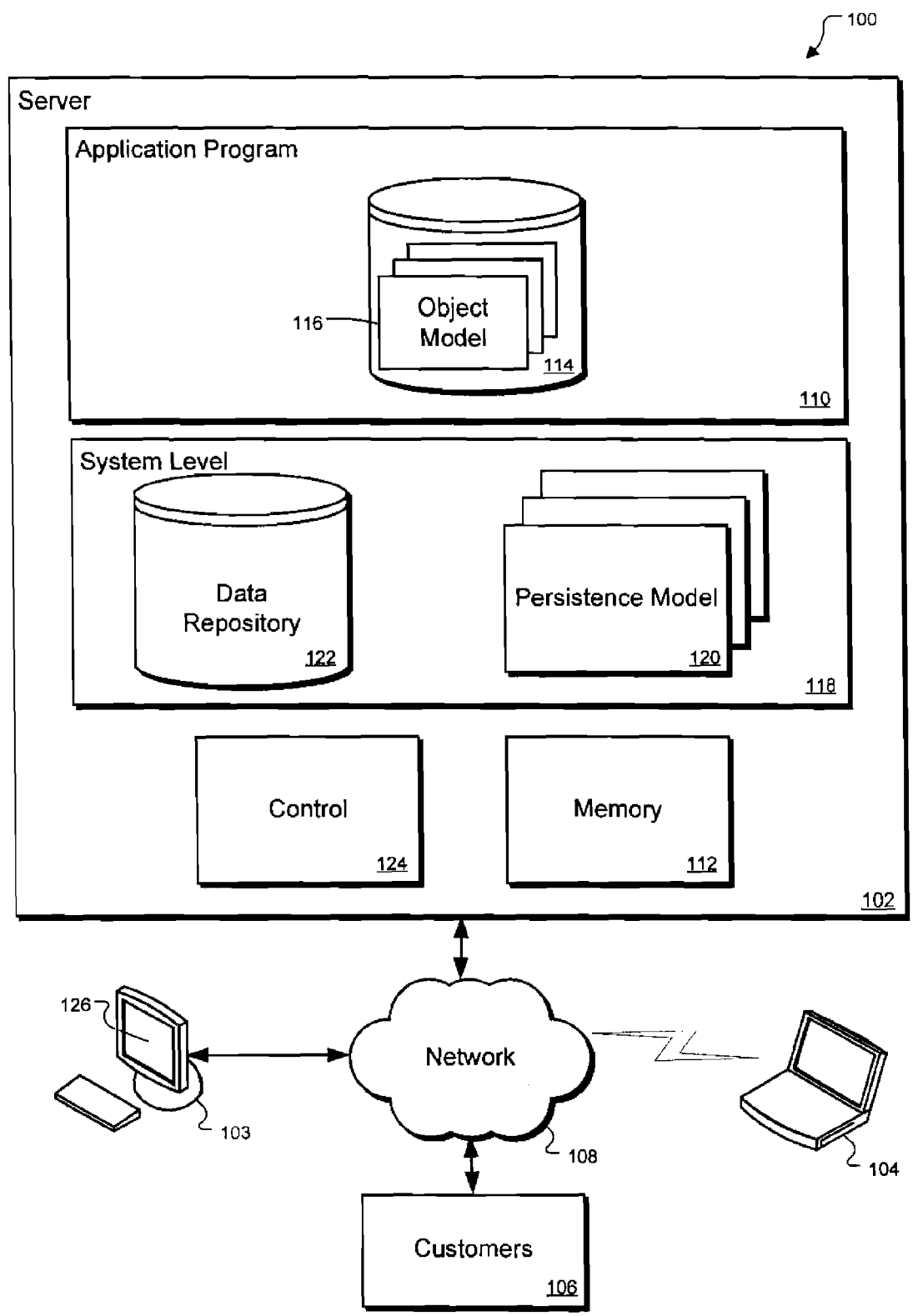
FIG. 1 is a block diagram of an exemplary system that can be used for dynamically selecting and applying a persistence model for storing a data object instance.

FIG. 1 is a block diagram of an exemplary system 100 that can be used for dynamically selecting and applying a persistence model for storing a data object instance. The implementation shown in FIG. 1 is illustrative, and many variations are possible. In an implementation, a persistence model can define a storage method for storing business objects and their respective object instances to a database such that they may be retrieved and restored according to a user's expected functionality. For example, persistence models may specify varying levels of sophistication for storing objects to a database, which levels may facilitate varying levels of system functionality and system performance. In an implementation, the system 100 may dynamically select an appropriate persistence model for an instance of an object such that an improved balance of performance and functionality may be realized on an instance-by-instance basis. In general, the stored objects may be associated with a field, a screen, an error message, a business process, a best-practices level, or another entity containing business or data object content. Business object content may include sales orders, service orders, leads, opportunities, contact persons, campaigns, target groups, invoice statements, customer quotes and emails, to name just a few examples. The business object list above is not all-inclusive and, as such, other business objects, other data objects, and content may be stored and restored in the system 100.

The system 100 may be hosted in a client device or a server device. In the example of FIG. 1, the system 100 is shown hosted in a server device 102. In general, the system 100 may dynamically assign a persistence model for one or more business objects at run time. In particular, the system 100 may be used to dynamically select a persistence model for archiving and restoring objects in the system 100. Several persistence models may be available for a given object, and depending on the persistence model selected, varying levels of functionality and performance characteristics may be realized. For example, according to some implementations, a persistence model may provide more focus on performance, but narrower focus on functionality. Such a model may be considered a "lean" persistence model. Another persistence model may provide broad focus on expanded functionality, but less focus on performance, and may be considered a "rich" persistence model. As used herein, a persistence model that focuses more on performance than functionality will be referred to as a lean persistence model. Similarly, a persistence model that focuses more on functionality or flexibility than performance will be referred to as a rich persistence model. For clarity, the examples described herein will assume two persistence models, but it will be appreciated by those skilled in the art that any number of persistence models may be used, each defining how a data object is to be stored in a database to realize expected levels of one or more of performance, functionality, or another relevant metric, according to an implementation.

In an implementation, the lean persistence model may store object data in a relatively simple or flat architecture, as to not degrade system performance. For example, update time, throughput, disk space, memory consumption and other performance factors may be optimized using the lean persistence model. The lean persistence model may further optimize system resources by storing objects locally. In some implementations, the lean persistence model may specify storage of data objects utilizing a smaller number of database tables than are specified for storing an object by the rich persistence model. For example, one database table may be used, or a compression scheme may be used on the object data such that the data can be stored in one database table.

In an implementation, the rich persistence model may store object data in a more complex format using more than one database table on a central device, for example. Further, the rich persistence model may provide easier searching functionality for the system user. In some implementations, business objects may be stored with the rich persistence model because specific functionality may be desired upon retrieving the object information. For example, when archiving an email business object, readability may be an important function upon retrieval of the email. Thus, the rich persistence model may be dynamically selected to enhance readability.

In operation, the system 100 may assign a persistence model to an object instance upon analyzing the object data. For example, the system 100 may analyze a database table for a particular business object and assess the functionality of the business object. Specifically, the system 100 may examine data flags that may specify requirements for functionality or performance regarding the object data, according to an implementation. For example, one flag may indicate that the business object data may require modifications at some time in the future. Thus, the flag may be set (e.g., by the system) in the database table to "can be modified." Further, the modification requirement in this example may indicate that the object data be stored in a relatively sophisticated way, which may cause the system to select the rich persistence model.

In general, the assignment and mapping of the persistence model may be transparent to the user, according to an implementation. The architecture can internally and automatically determine the persistence model based on functionality and performance specifications or requirements. The functionality and performance specifications or requirements can be extracted from business object database tables, according to some implementations. As such, the user may simply use the business objects as called for in a particular application, without concern over how the business object was persisted. Further, the business object logic implementing the business object may not have knowledge of the assignment or mapping of the persistence model. As such, business object logic can be common or similar for all instances of the same business object, but a different persistence model may be selected. Advantageously, performance enhancements for the business objects can be added with low overhead due to sharing similar logic.

Turning to the illustrated implementation, the system 100 may generate a persistence model in the server device 102 for one or more client devices 103, 104, or customers 106, at least some of which can communicate with the server device 102 across a network 108. The server 102 may generally host application software for assigning and managing persistence models in response to business object usage in the system, according to an implementation. The server 102 comprises an electronic computing device operable to receive, transmit, process and store data associated with the system 100. Although FIG. 1 illustrates one server 102 that may be used with the disclosure, the system 100 may be implemented using computers other than servers, as well as a server pool. The server 102 may be any computer or processing device, such as, for example, a blade server, general-purpose personal computer (PC), Macintosh, workstation, Unix-based computer, or any other suitable device. According to one implementation, the server 102 may also include or be communicably coupled with a web server and/or a mail server.

The system 100 includes an application program 110, such as an enterprise resource software application. As is conventional, the application program 110 may be stored in a non-volatile storage location, internally or externally to the server 102, and may be transferred to memory 112 for active use by the system 100. In one implementation, the application program 110 includes a repository 114 for storing one or more object models 116 capable of persisting data objects and their respective instances. The object models 116 may define a template for how information is stored for each business object. For example, a sales order business object may include several fields to describe the sales order. As such, various flags may be set to indicate which fields contain data and how the data is contained. In some implementations, the set flags or other data fields may be analyzed to determine which persistence model is most appropriate for a particular business object. Although the illustrated application program 110 includes one repository 114 and three object models 116, additional or fewer repositories and models may be functionally used.

The memory 112 may include any memory or database module and may take the form of volatile or non-volatile memory including, without limitation, magnetic media, optical media, random access memory (RAM), read-only memory (ROM), removable media, or any other suitable local or remote memory component. The illustrated memory 112 may store system data such as data object content, network applications or services, firewall policies, a security or access log, print or other reporting files, data classes or object interfaces, unillustrated software applications or sub-systems, and others.

The server 102 also includes a system level layer 118. In an implementation, the system level layer 118 may host one or more persistence models 120. The persistence models 120 may be accessed and selected by the application program 110 when storing and retrieving business object content. In particular, the application program 110 may select a persistence model for a data object. According to some implementations, a persistence model may be assigned to instances of a business object on an instance-by-instance basis. That is, a first instance of a business object may be persisted according to a first persistence model, such as a lean persistence model, and a second instance of the same business object may be persisted according to a second persistence model, such as a rich persistence model. This may facilitate flexibility in the storage of data object instances, as specific object instances may be optimally stored according to performance or functionality requirements, without requiring that all instances of the same business object be stored in the same way. Furthermore, the persistence model may vary during the lifetime of a data object instance. For example, an instance with relatively little data may be stored first in the lean persistence model. If the instance is updated with additional data requiring more functionality, then the updated instance may be stored on the database using the rich persistence model due to the additional functional requirements, according to some implementations.

The persistence model may indicate how to store the business object. For example, the persistence model may be defined to store a business object in one or several database tables. In general, a business object may be assigned a persistence model at ran time. Thus, a persistence model may be modified on-the-fly. In some implementations, new instances of the same business object may be assigned with a different persistence model than the previous instances. For example, a large business object with broad functionality may use a large persistence model (database model) in one scenario, while the same business object may use a smaller persistence model when the object is using less functionality. As such, the persistence model defining an appropriate level of sophistication may be selected at run time for object instances.

The system level layer 118 may include one or more data repositories 122. In some implementations, the data repository 122 may hold stored object data. As such, several databases may be included in the repository 122, External storage for storing business object data may also be provided. In addition, the data repository 122 may be used to load and run application programs.

The server 102 also includes control devices 124. The control devices 124 may include one or more processors to execute instructions and manipulate data for performing the operations of the server 102. The control devices 124 may include, for example, a central processing unit (CPU), a blade, an application specific integrated circuit (ASIC), a field-programmable gate array (FPGA), or other suitable hardware or software control system. In the illustrated implementation, the control devices 124 execute instructions that comprise the application program 110.

The network 108 facilitates wireless or wired communication between the server 102 and any other local or remote computers, such as clients 103 and 104, and customers 106. The network 108 may be all or a portion of an enterprise or secured network. In another example, the network 108 may be a virtual private network (VPN) between the server 102 and the client 103 across a wireline or a wireless link. While illustrated as a single or continuous network, the network 108 may be logically divided into various sub-nets or virtual networks without departing from the scope of this disclosure, so long as at least a portion of the network 108 may facilitate communications between the server 102 and at least one client (e.g., client 103). In certain implementations, the network 108 may be a secure network associated with the enterprise and certain local or remote clients, such as customers 106.

The client 103 or 104, or the customer device 106 may be any computing device operable to connect or communicate with the server 102 or the network 108 using any communication link. At a high level, each client 103 may include or execute at least one hosted business application graphical user interface 126. In some implementations, the interface 126 may host the application program 110. There may be any number of clients 103 communicably coupled to the server 102. As used in this disclosure, the client 103 is intended to encompass a personal computer, touch screen terminal, workstation, network computer, kiosk, wireless data port, smart phone, personal data assistant (PDA), one or more processors within these or other devices, or any other suitable processing device. For example, the client 103 may be a PDA operable to wirelessly connect with an external or unsecured network.

Regardless of the particular hardware or software architecture used, the application 110 may be generally capable of dynamically selecting and implementing a persistence model in a business application. Users of the application 110 may include sales personnel, customer service personnel, field applications personnel, repair or installation personnel, or any other user of business information. The following descriptions focus on the operation of the application 110, or one of its components or sub-modules, in performing one of the respective methods or processes. However, the system 100 contemplates using any appropriate combination and arrangement of logical elements implementing some or all of the described functionality.

Figure 2:
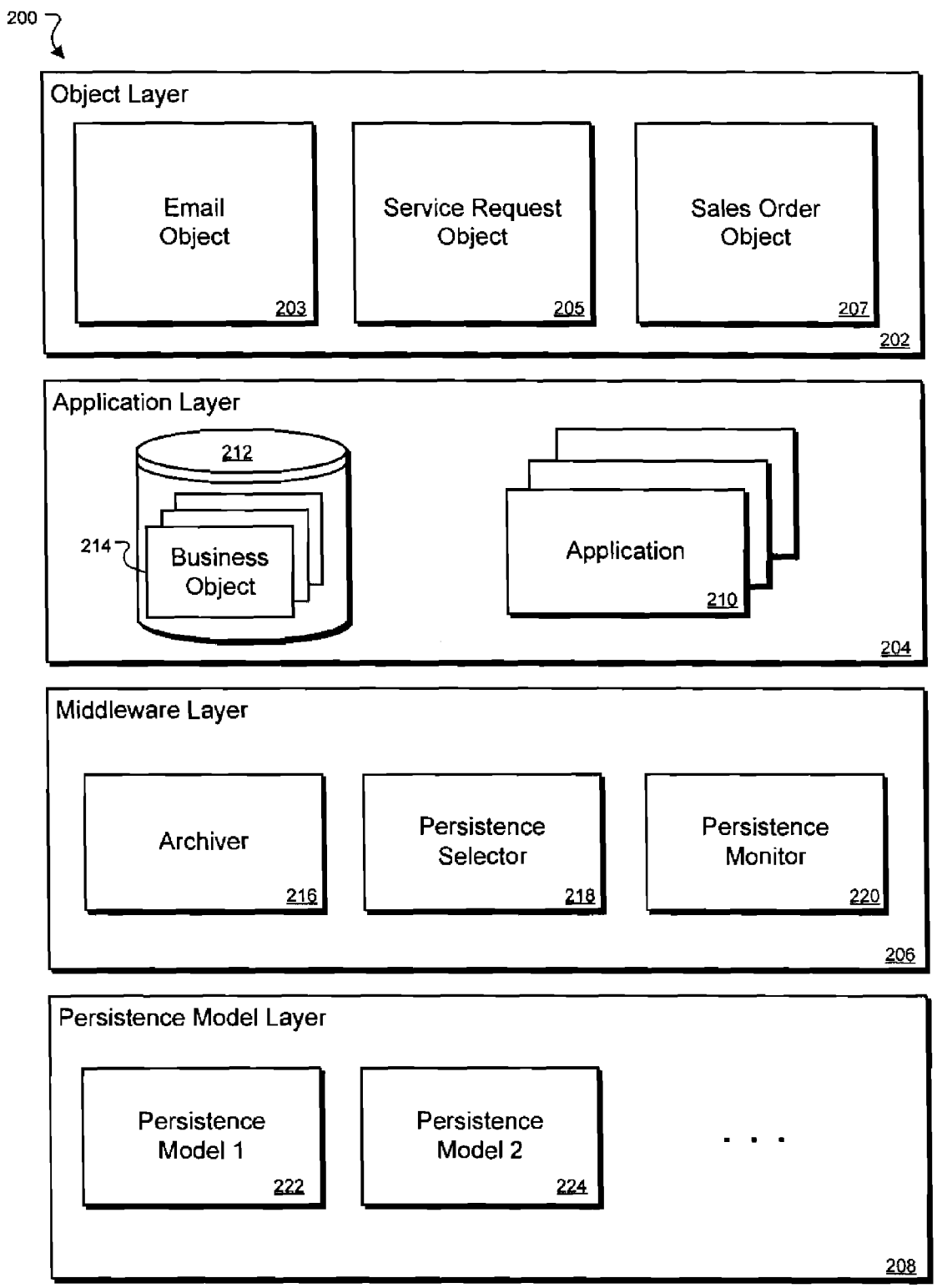
FIG. 2 is a block diagram of an exemplary architecture that can be used for dynamically selecting a persistence model in a computing system.

FIG. 2 is a block diagram of an exemplary architecture 200 that can be used for dynamically selecting a persistence model in a computing system. The architecture 200 may be hosted in a client device, such as client device 103 or 104

(FIG. 1). In some implementations, the architecture may be hosted externally at a customer site, as shown by customers 106 (FIG. 1). In some implementations, the architecture may be represented by a business application in an enterprise resource computing system, but the disclosure may be applicable to any computing environment. The architecture 200 includes various layers of software for centrally managing data according to a selected persistence model. The layers shown here include: an object layer 202, an application layer 204, a middleware layer 206, and a persistence model layer 208.

The object layer 202 may store data object model architectures. A model architecture may indicate how to access business object implementations in the application layer. Here, the business object layer 202 includes an email object 203, a service request object 205, and a sales order object 207, but in other implementations, any number of objects may be included. According to an implementation, the email object 203 may contain information communicated via the Internet or an internal groupware server. In general, the email object 203 may include text, recipients, and attachments, for example, though additional or fewer constituent components may be used. The service request object 205 may contain service notification information reflecting an initial inquiry from a customer when contacting a customer service representative or support center, according to an implementation. In an implementation, the service request object 205 may generally includes customer data, the nature of the request and the customer's product in question, text notes describing the issue, and attributes that classify the request, problem, reason, and severity, to name a few examples. Service requests may also include immediate validation of existing service entitlements, such as agreed service levels and existing service contracts or product warranties. The sales order object 207 may contain agreement documents between a seller and a customer concerning a sale and delivery of goods, as well as any services that are associated with these processes, on a specific date, for a specific quantity, and for a specific price, in one example. The object models described above are meant to be illustrative, and one skilled in the art will recognize that the models may include various options at varying levels of complexity. In some implementations, the business objects above may be described as data objects, as they may contain information storable in database tables.

The application layer 204 may provide an interface to the object layer 202, the middleware layer 206, and the persistence model layer 208 in the architecture 200. The application layer 204 may perform common application services for application processes, such as business object modification, for example. The application layer 204 may also link to a user interface to present information to a user. In this example, the application layer 204 includes one or more running applications 210. The application 210 may utilize implementations of the business objects from the object layer 202. For example, if the application 210 is an email application, an instance of the email object 203 may be instantiated and used when an email is constructed and sent. The application layer 204 may also include a data repository 212 that may store the instances of objects 214 during use. The object instances 214 may be created, modified or deleted by the business application 210.

The middleware layer 206 may connect software components and applications in the architecture 200. In particular, the middleware layer 206 may connect two or more software applications so that they can exchange data. The middleware layer 206 may support complex, distributed applications, such as application 210. In some implementations, the middleware layer 206 may include web servers, application servers, content management systems, and similar tools that support application development and delivery of services, for example. As shown in the example of FIG. 2, the middleware layer 206 includes an archiver 216, a persistence selector 218, and a persistence monitor 220. In some implementations, the middleware layer 206 or functionality associated with the middleware layer may be above or below other layers in the architecture 200. For example, in some implementations the middleware layer 206 may be above the application layer 204 and the object layer 202. It will be understood that functionality associated with any of the layers shown in FIG. 2 may be combined or separated as appropriate, and that the position of various layers with respect to other layers may be varied.

The archiver 216 may combine a number of files together into one archive file, or a series of archive files, for easier transportation, storage, or retrieval. In some implementations, the archiver 216 may store file data by concatenating the data content sequentially into storage. In some implementations, information about file names and lengths may be archived to facilitate file reconstruction at a later time. In addition, the archiver 216 may store metadata about a file that the operating system may provide, such as one or more timestamps, and information pertaining to ownership and access control. In some implementations, the archiver 216 may use lossless data compression in order to reduce the size of the archive.

The persistence selector 218 may determine an appropriate persistence model for a particular business object instance. For example, the persistence selector 218 may determine an appropriate persistence model by analyzing system performance and the functionality of any or all business objects used in an application. In addition, the persistence selector 218 can communicate with the application layer 204 and the persistence model layer 208 via the middleware layer 206 to determine and assign an appropriate persistence model. Persistence models may be selected on an object instance basis, and may be selected based on an expected usage for a particular object instance, regardless of whether other instances of the same object may be stored according to one or more other persistence models. Also, persistence models may be selected at run-time and in a manner transparent to a user, according to some implementations. That is, the user may not be aware of a system selection of a persistence model. Also, over the course of its lifetime, a given instance of a data object may be stored according to more than one persistence model. For example, an instance may initially be stored according to a first persistence model, such as a lean persistence model, and may later be stored according to a second persistence model, such as a rich persistence model. Selecting an appropriate persistence model can be done in several ways. For instance, the persistence model may be selected according to an existence or nonexistence of data structures. For example, if an object instance does not include an attachment, a simpler model that does not support attachments may be selected. This may advantageously conserve system resources and facilitate increased performance. As another example, data in the data object may be examined to determine an appropriate model. Examples of such data may include one or more flags, data fields, structures, or internal tables. As yet another example, a persistence model may be chosen based on a reference to a master data object in the data object. That is, a data object may reference another, already persisted, data object, and this reference may be used to similarly persist the data object. As yet another example, a status of an instance may be used to select an appropriate persistence model. A document that is "complete and non-changeable," for instance, may be persisted in minimal form, compressed form, or may be archived. Other examples are possible in various implementations.

The persistence monitor 220 may monitor the selection of persistence models for data objects over time. The monitoring may include an analysis of performance to ensure a suitable persistence model is provided. In some implementations, the persistence monitor 220 may attempt several different persistence models on one business object to provide an efficient persistence model. The persistence monitor can recommend changes to persistence model analysis or selection processes as appropriate. In this fashion, the system may respond to changes and yet continue to operate optimally.

The persistence model layer 208 may store predefined persistence models for some or all of the data objects used in the architecture 200. In some implementations, several persistence models may be stored for each object. The architecture 200 may dynamically select a persistence model that may be best suited to the current scenario. As shown in FIG. 2, the persistence model layer 208 includes a first persistence model 222 and a second persistence model 224 that may represent a lean persistence model and a rich persistence model, for example. Although only two persistence models are depicted for clarity, several persistence models may be included and accessed in the persistence model layer 208.

Figure 3:
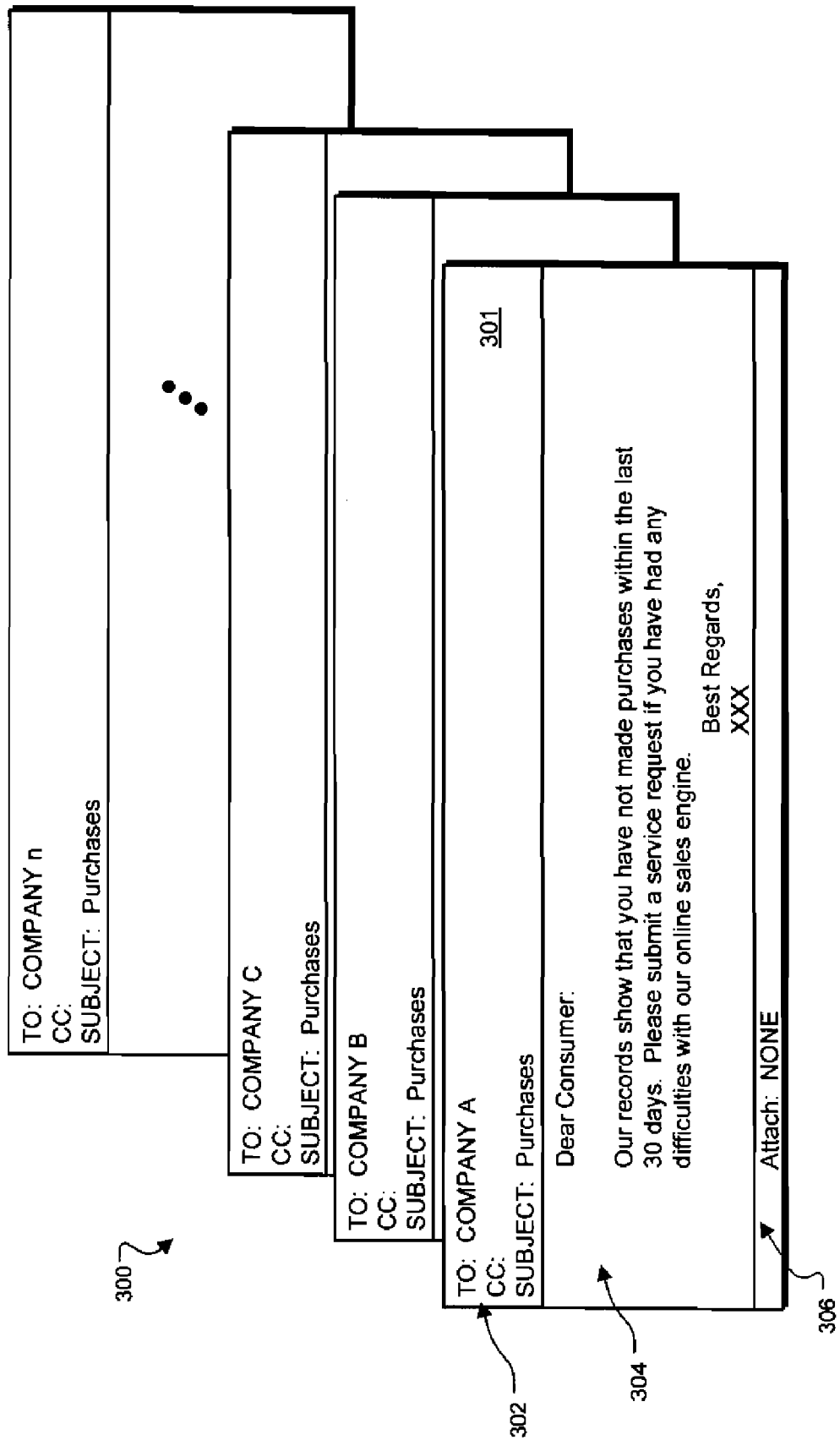
FIG. 3 is an exemplary collection of several instances of an email business object.

FIG. 3 is an exemplary collection of several instances of an email business object. The email business object instances 300 may represent a mass customer outbound email, such as a sales update, according to an implementation. As another example, the email may be a newsletter, sales call, service update, recall notice, or other mass distributed information. As shown here, the email business object instance 301 includes a party section 302 for recipient and subject entry, a body section 304 for text, and an attachment section 306 for attaching documents. The email business object text 304 is a sales update that may include similar formulaic text for the body of each individual email. The email business object instances 300 are addressed to several different recipients (Company A, Company B, Company C, ... Company n) in the party section 302. As such, the email instances 300 may be created from one template, such as the email business object. In an implementation, a large number of email instances may be created, such as 100,000 email instances, for example. In some implementations, several templates may be used to create a mass email. In some implementations, the attachment section 306 may include one or more attached documents.

At some point before or after sending the email, the instances 300 may be stored according to a persistence model. In other words, the emails may be stored in a hierarchy or map in a data repository. The persistence model may be assigned based upon results from a system analysis of the business object and its intended functionality. In one implementation, the system 200 may process all instances 300 of the business object and individually assign a persistence model to each of the instances 300 based on the analysis. In another implementation, the system 200 may select a sample of instances for processing to assign a persistence model. In yet another implementation, specific details such as the presence of an attachment may indicate the selection of a particular persistence model.

Figure 4:
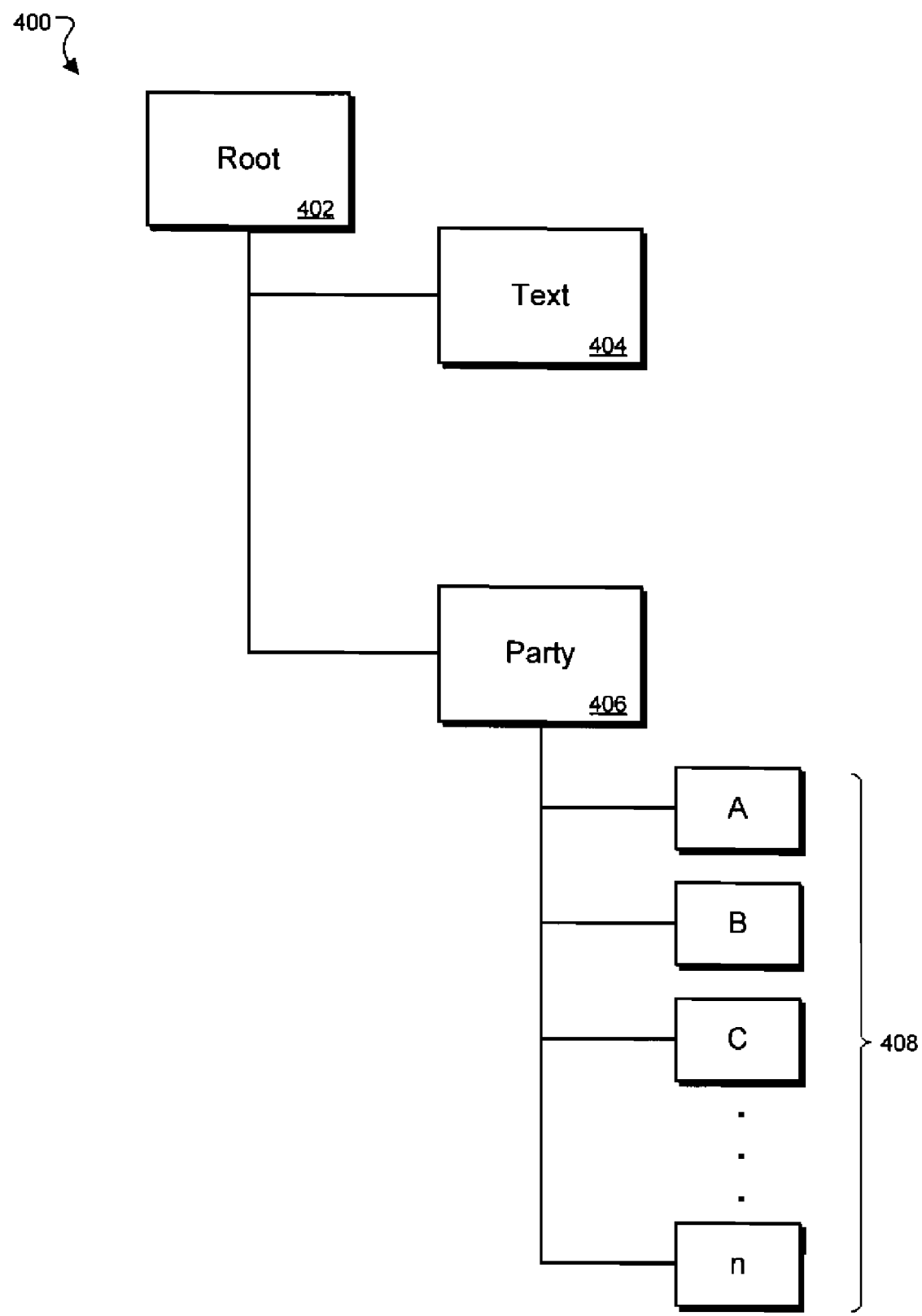
FIG. 4 is a data object map showing an exemplary structure for the email business object instances of FIG. 3.

FIG. 4 is a data object map 400 showing an exemplary structure for the email business object instances 300 (FIG. 3). The data object map 400 includes data from the party section 302, the body section 304, and in some implementations, data may be included from the attachment section 306 of the email instances displayed in the example of FIG. 3. Specifically, the recipient, text, and attachment data from FIG. 3 is here shown mapped in a particular hierarchy for storage and retrieval. In some implementations, the data and hierarchy information may be used to select a database persistence model for the email instances 300.

The data object map 400 begins with a root directory 402 that includes subdirectories for data object content. The system 200 may use the data object map 400 to organize the data object content into a text directory 404 and a party directory 406. In some implementations, other directories may be included, such as an attachment directory, when attachments are present, as well as other appropriate directories, as needed. Here, the text directory 404 is a represented as a flat directory (e.g., without nested sub-directories) since the email instances 300 include similar formulaic text, in one implementation. The party directory 406 includes several subdirectories 408 indicating the recipient (A, B, C, ..., n) of each email. Regardless of the number of directories or subdirectories, the information in the data object map 400 may be used to select a database persistence model for the included data object content. In some implementations, the persistence model may be included with the data object. For example, the data object may include a preferred method of archiving, such as in the event that a default persistence model has been defined for the object. A persistence model may itself be a data object.

The data object map 400 shown in FIG. 4 shows a single root directory 402 and a single party directory 406. However, in another implementation, each data object instance may include a separate root directory, and may include two party directories, one for the sender and one for the recipient.

Figure 5:
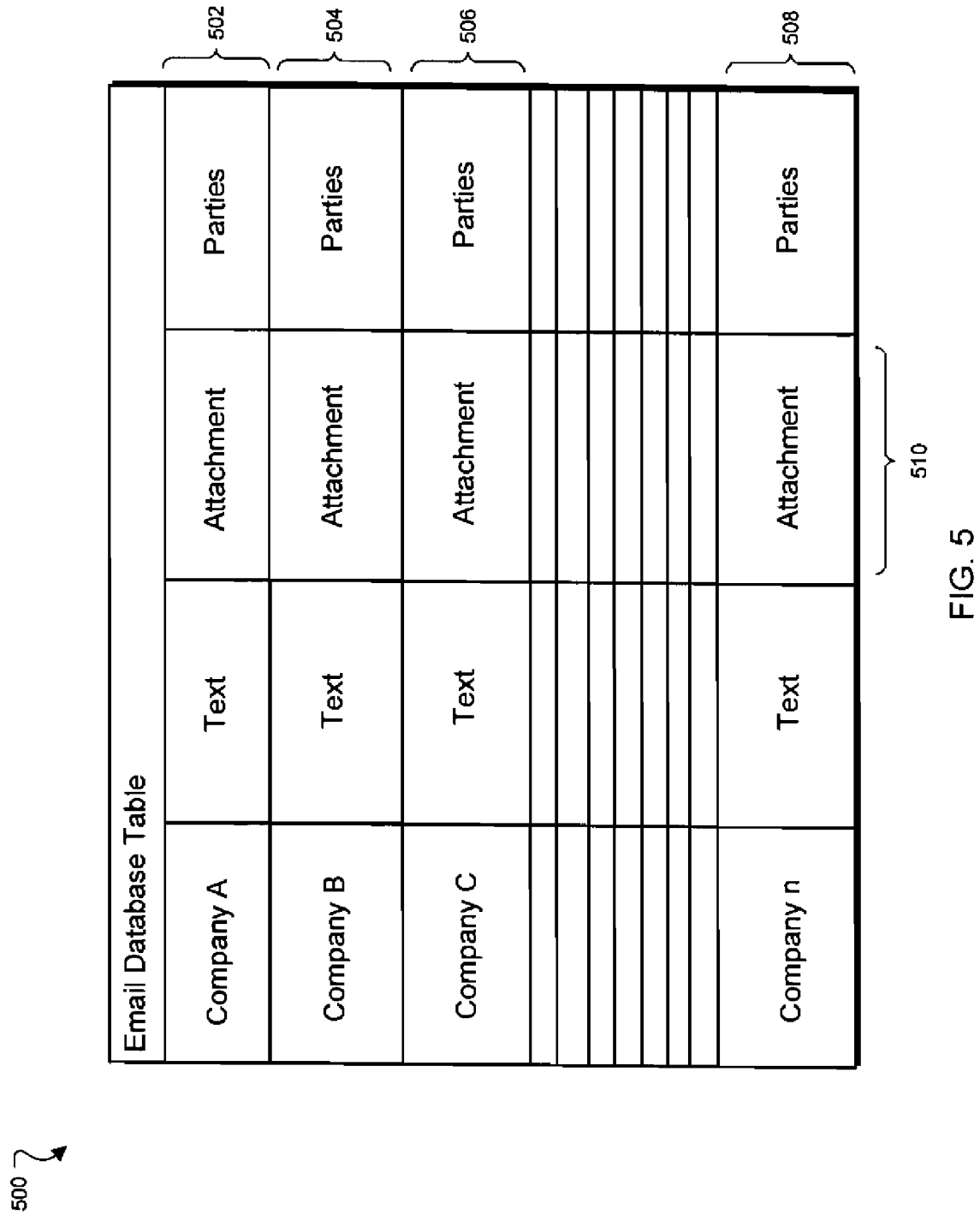
FIG. 5 is an example of a database table that can be used for storing the contents of the email business object instances of FIG. 4.

FIG. 5 is an example of a database table 500 that can be used for storing the contents of the email business object instances of FIG. 4. Here, the data object map 400 (FIG. 4) is represented as a single database table 500 including several data elements. The database table 500 may be illustrated as a flat model consisting of a single, two-dimensional array of data elements where the data elements in a column include similar values and the data elements in a row indicate a relation to one another. For example, the relation shown here depicts the elements in each row as components in one business object instance. In some implementations, the relationship between data elements may indicate dynamic selection of one persistence model over another persistence model. For example, the data content and relations are relatively simple here, and thus a lean persistence model may appropriately store the data content. As such, less memory space may be used to archive the business object instances, and performance characteristics such as throughput, access time and the like may be improved.

The database table 500 may generally represent a composed email sent to one or more recipients. For example, the email data elements for the data object instance "Company A" are shown in one row 502 where the data elements correspond to the text 404 and the parties 406 from the hierarchical structure in FIG. 4. Similarly, object instances are shown for "Company B" in a row 504, "Company C" in a row 506, and so on, up to "Company n" in a row 508. In some implementations, the database table 500 may represent several composed emails sent to one recipient. In some implementations, the database table 500 may include empty cells indicating that information is missing or non-existent for a particular business object instance. For example, the attachment column 510 may exist in the database table 500, but because there are no attachments to the emails shown in FIG. 3, these entries in the table may not be populated. In some implementations, the attachment column may not be stored in the database table 500 if attachments do not exist for one or more instances.

Referring again to the alternative implementation discussed above in connection with FIG. 5 where each data object instance includes a separate root directory and party directories for the sender and for the recipient, an additional row for the "sender party" (not shown in FIG. 5) may be included in the table 500. In some implementations, an additional "sender" row may be included to correspond to each of the recipient rows.

Figure 6:
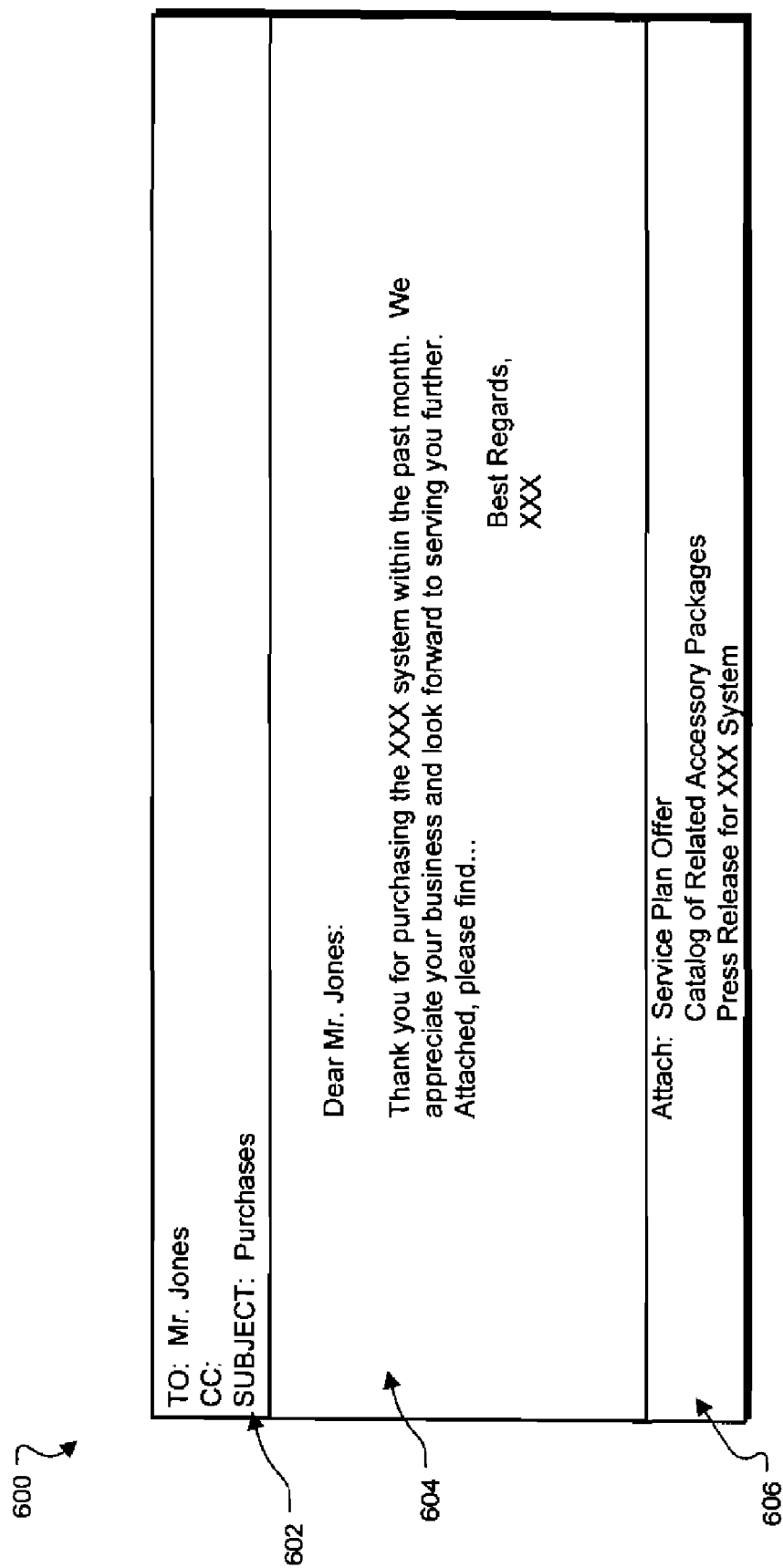
FIG. 6 is an example of an instance of an email business object that includes attached documents.

FIG. 6 is an example of an instance of an email business object that includes attached documents. The email business object 600 may represent a mass customer outbound email, such as a service update that may be sent to 100,000 recipients, for example. As shown, the email business object includes a party section 602 for recipient and subject entry, a body section 604 for text, and an attachment section 606 for attaching documents. The body section 604 here is a service update that includes individualized text for recipients of the email.

In some implementations, the email business object may include attachments in the attachment section 606. As such, individual attachments may be selected according to a particular customer purchase, for example. In the depicted example, there are specific attachments in the attachment section 606 that correspond to the recipient's purchases. Because some email recipients may receive attachments customized to their particular situation, a persistence model defining a more sophisticated functionality may be appropriate in certain cases. One such persistence model may define that attachments may be stored in a separate database table on a server having a large amount of memory allocated for email storage. As such, the persistence model may be a rich persistence model that allows for extra memory or resource usage. While some lean persistence models may support only one attachment, richer persistence models may support multiple attachments, and may therefore accommodate the multiple attachments of the email shown in FIG. 6. In some implementations, the business object instance may have a level of complexity that may benefit from the use of several database tables to store the business object content.

Figure 7:
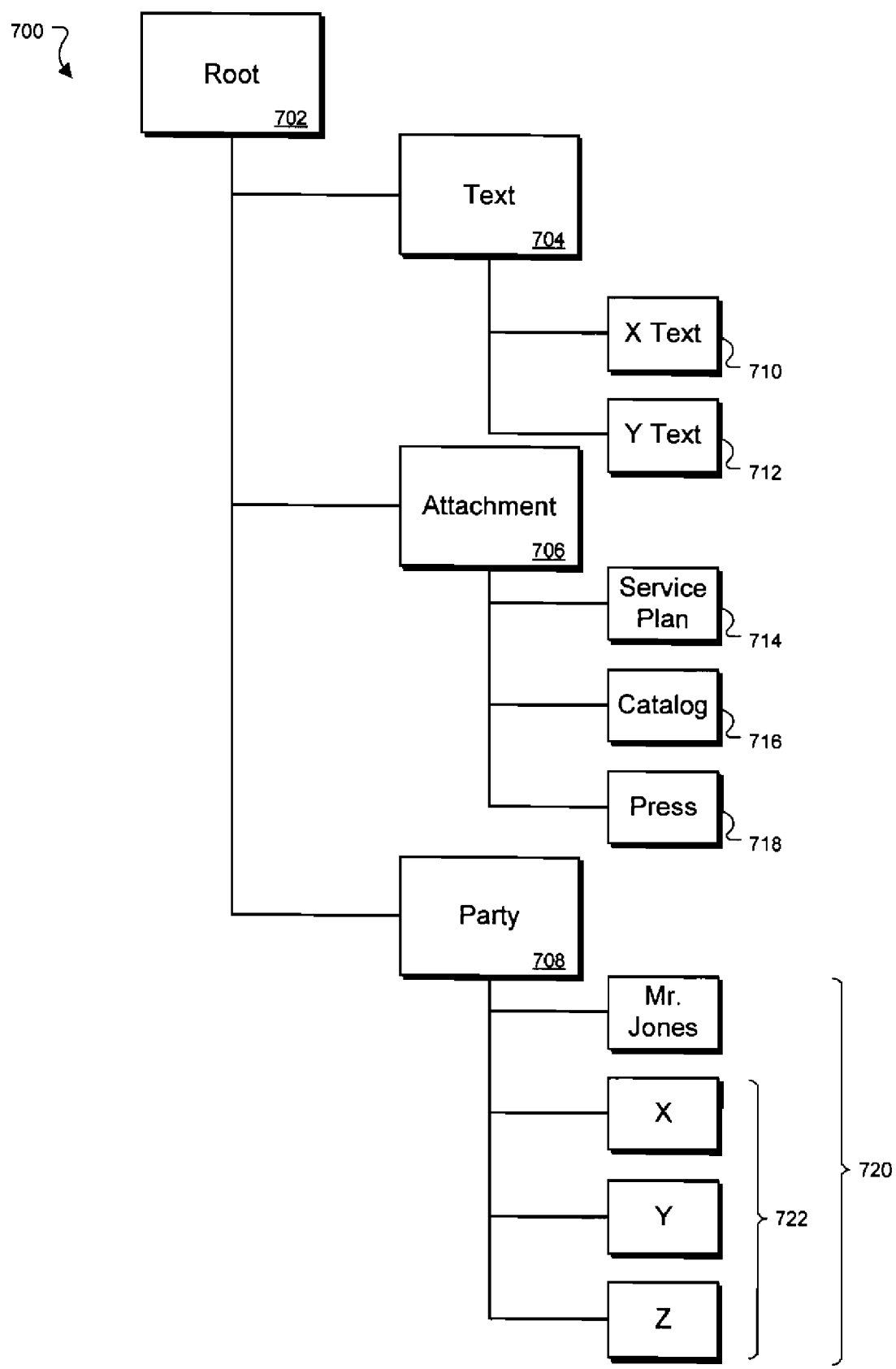
FIG. 7 is a data object map showing an exemplary structure for the email business object instance of FIG. 6.

FIG. 7 is a data object map 700 showing an exemplary structure for the email business object instance of FIG. 6. The structure shown in FIG. 7 may correspond to a richer model than the model associated with the structure shown in FIG. 4 and described above. The data object map 700 includes data from the party section 602, the body section 604, and the attachment section 606 (FIG. 6). Specifically, the data from FIG. 6 is mapped in a particular hierarchy for storage and retrieval. The data object map 700 begins with a root directory 702 that includes subdirectories for business object content. Specifically, the system 200 may use the data object map 700 to organize the business object content into a text directory 704, an attachment directory 706, and a party directory 708. In some implementations, other directories may be included. Here, the text directory 404 includes an "X-Text" template 710 and a "Y-Text" template 712 that may correspond to the text created for one or more unique recipients. For example, the content in the body section 604 (FIG. 6) may represent the "X-Text" template. Similarly, the attachment directory 706 includes a "Service Plan" attachment 714, a "Catalog" attachment 716, and a "Press" attachment 718. The attachments 714, 716, and 718 correspond to the attached documents indicated in FIG. 6. Similarly, the party directory 708 includes the recipients 720 intended to receive the email 600. The recipients 720 include "Mr. Jones" (shown in the party section 602 in FIG. 6) and three other intended recipients 722 (e.g., X, Y, and Z). Email business object instances may be constructed for the recipients 722 similar to the email business object 600.

Figure 8:
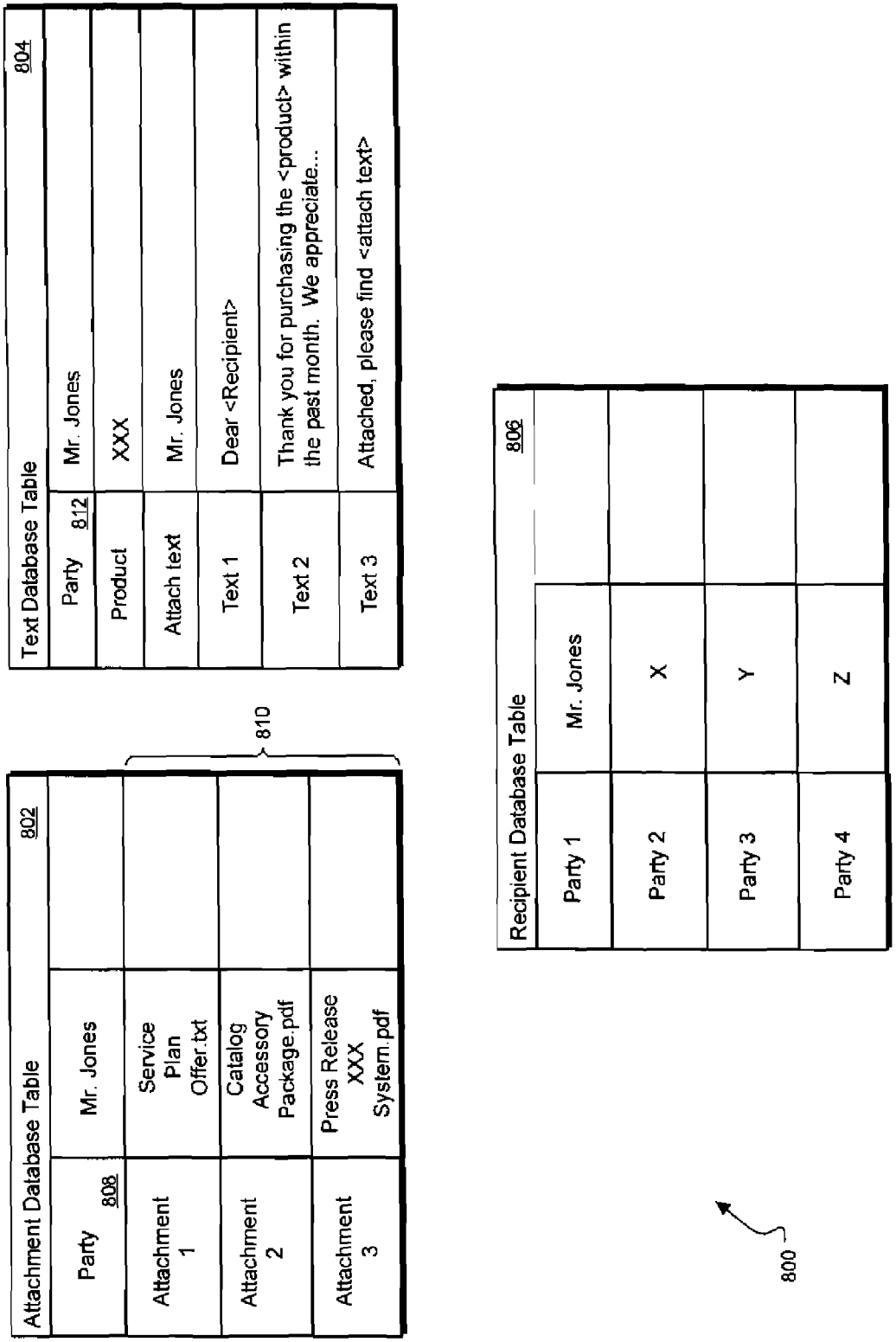
FIG. 8 is an exemplary collection of database tables that can be used for storing the contents of the email business object instance of FIG. 6.

FIG. 8 is an exemplary collection of database tables that can be used for storing the contents of the email business object instance of FIG. 6. Here, the tables include an attachment database table 802, a text database table 804, and a party database table 806. Specifically, the data object map 800 is represented as multiple database tables having different data element types in each table. The collection of database tables may be structured in various ways. For example, the collection of database tables may be arranged according to a database model such as a hierarchical model, a network model, a relational model, an object-relational model, or an object model, to name a few examples. In particular, the database model may specify the relationship between the tables and how the database tables may be structured, joined, split, and used.

The example illustrated in FIG. 8 may be arranged in a relational database model, for example. The relational database model generally may include multiple tables, similar to the flat database model depicted in the example in FIG. 5. As such, multiple flat database tables may be connected to make a relational database model. The relationship between elements in the various flat database tables may be predefined by the application storing the data elements in the table. For example, the attachment table 802 includes a party row 808, and three rows 810 of attachment data corresponding to the party row 808. In some implementations, a database table similar to table 802 may exist for each party receiving an email having attachments. In some implementations, the database tables may include duplicate rows or columns.

In the relational database structure shown, relationships between the various flat database tables may not be explicitly defined; instead, keys may be used to match up rows of data in different tables. A key may include a collection of one or more columns in one table whose values match corresponding columns in another table. For example, the text database table 804 may include a row named "party" 812, which here contains a value that matches the key of the party database table 806. In general, any column can be a key, or multiple columns can be grouped together into a single key. Although, the examples in this description are described using flat database models or relational database models, other database models are possible.

Referring now to the simple emails shown in FIG. 3 and the more complex email shown in FIG. 6, it may be a company's policy at the end of a certain time period to send an email to all of its past customers detailing recent purchasing activity. If the company sells large, complex systems that tend to be put in use for extended periods of time, it may be typical that in a given period, a large majority of its customers may not have made a purchase. For these customers, a simple email such as those shown in FIG. 3 may suffice, where boilerplate text may comprise the body of the email, with little or no personalization. On the other hand, for a customer that has made a recent purchase, a more personalized email such as the email shown in FIG. 6 may be appropriate. Suppose, in one example, that the company has 100,000 customers, and in a recent period 10 customers made purchases while 999,990 did not. Suppose further that the company, as described above, wants to send out appropriate emails to all customers at the end of the period. In an implementation, the system may select a first persistence model, such as a lean persistence model, for the object instances corresponding to the customers that did not make a purchase, and may select a second persistence model, such as a rich persistence model, for the object instances corresponding to the customers that did make a purchase. As such, system resources may be conserved in storing the instances associated with the lean persistence model, while expanded functionality may be realized with the instances stored according to the rich persistence model. This may occur, for example, even though all of the emails may correspond to the same object model. As another example, mass emailing may be used in marketing campaigns. In this example, a majority of the emails may be stored in a lean format, while richer mails may be stored in a rich format.

Figure 9:
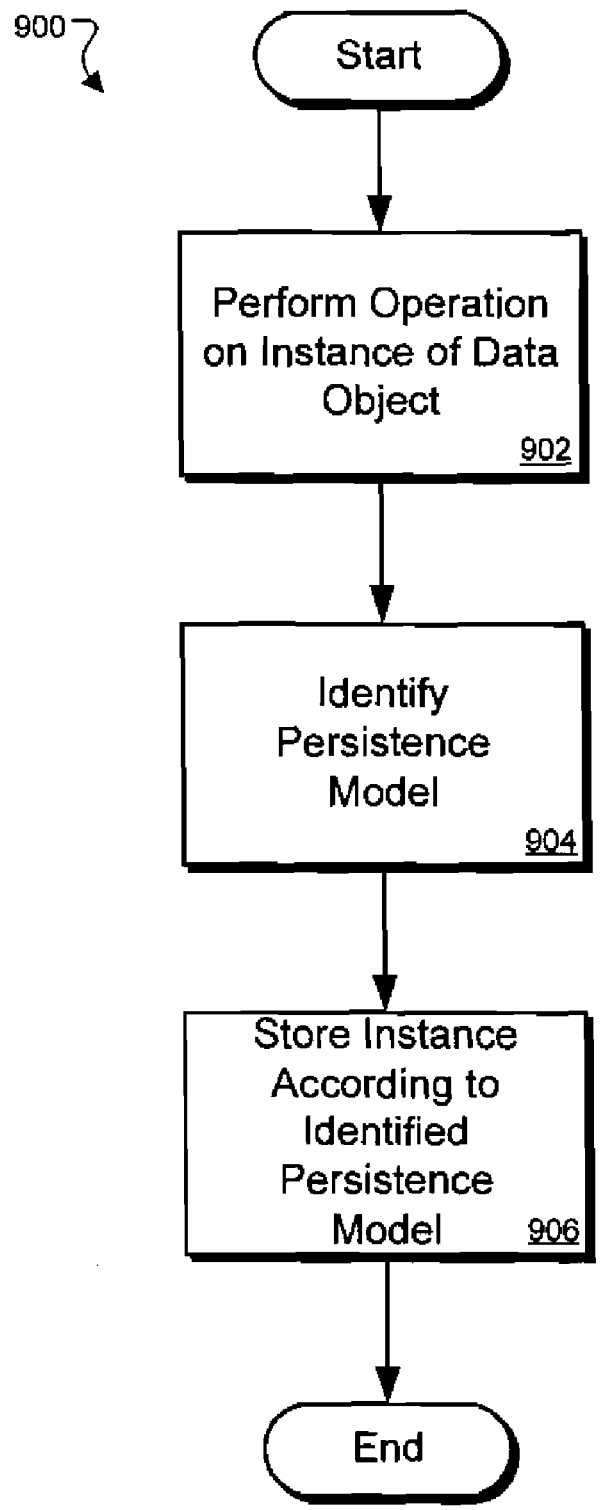
FIG. 9 is a flow chart of exemplary operations that can be performed to select and apply a persistence model to an instance of a business object.

FIG. 9 is a flow chart of exemplary operations 900 that can be performed to select and apply a persistence model to an instance of a business object. The operations 900 can be performed by a processor executing instructions stored in a computer program product. The operations 900 begin in step 902 with performing an operation on an instance of a data object. For example, one or more email object instances can be created and sent from a business application, such as application program 110.

In step 904, the operations comprise identifying a persistence model available for the data object. For example, the system 200 (FIG. 2) may use the persistence selector 218 to identify a suitable persistence model. The persistence selector 218 may use several factors when identifying a suitable persistence model. For example, the size, functionality, performance, or complexity of a data object or object instance may be used to identify the appropriate persistence model. System requirements, available storage capacity, memory consumption, throughput, update time, access time, or other performance or functionality considerations may also be used.

Next, in step 906, the data object instance can be stored according to the identified persistence model. For example, the application 210 (FIG. 2) may store one or more data object instances in the data repository 212 using a persistence model identified from the persistence model layer 208. The application 210 may locally or remotely store the one or more data object instances. As such, data object instances may be transmitted over a network for storage. For example, the server 102 may transmit email object instances to a customer server 106 over network 108.

Figure 10:
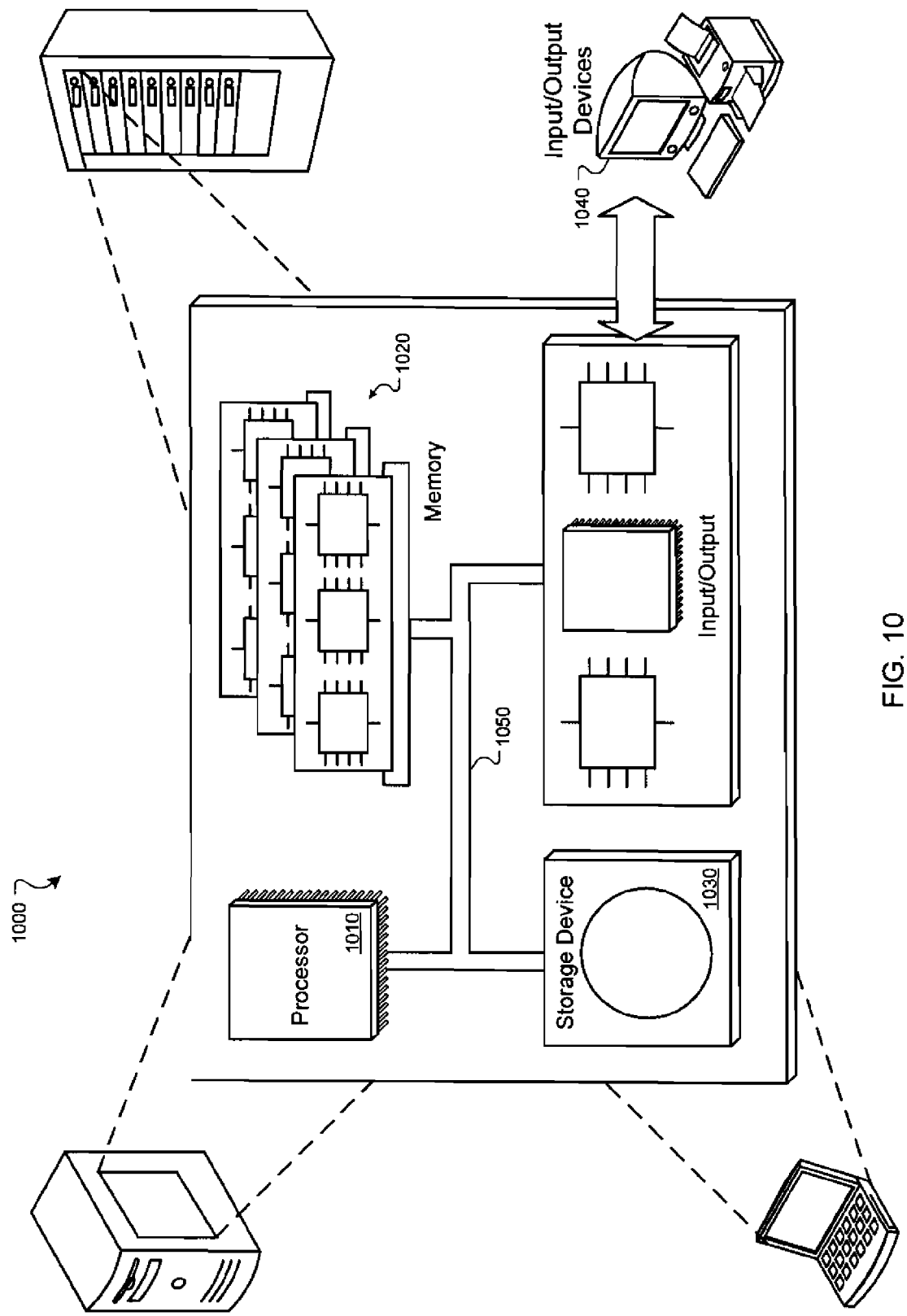
FIG. 10 is a block diagram of a computing system that can be used in connection with computer-implemented methods described in this document.

FIG. 10 is a block diagram of a computing system 1000 that can be used in connection with computer-implemented methods described in this document. The system 1000 can be used for the operations described in association with any of the computer-implement methods described previously, according to one implementation. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them.

The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of persisting an instance of a data object, the method comprising:
    performing an operation on an instance of a data object;
    identifying for the instance, at run-time, one of several persistence models that are available for the data object using the performed operation by determining an expectation of required functionality for the instance, each of the several persistence models defining how the data object is to be persisted in a database; and
    storing the instance in the database according to the identified persistence model.

2. The computer-implemented method of claim 1, wherein a first persistence model is identified for a first instance of the data object and a second persistence model, different from the first persistence model, is identified for a second instance of the data object.

3. The computer-implemented method of claim 2, wherein the first persistence model defines that the first instance of the data object be stored in one table in the database.

4. The computer-implemented method of claim 2, wherein the second persistence model defines that the second instance of the data object be stored in a plurality of tables in the database.

5. The computer-implemented method of claim 1, wherein the identifying the one of several persistence models occurs transparent to a user.

6. The computer-implemented method of claim 1, wherein the persistence model is a data object.

7. The computer-implemented method of claim 1, wherein the expectation of required functionality is determined by examining data in a table of the instance of the data object.

8. The computer-implemented method of claim 1, wherein the data object is an email.

9. The computer-implemented method of claim 1, wherein the instance is later stored according to another persistence model.

10. The computer-implemented method of claim 1, wherein determining the expectation of required functionality for the instance of the data object comprises determining whether the instance of the data object includes a data structure associated with the object.

11. A computer program product tangibly embodied in a computer-readable storage medium and comprising instructions that when executed by a processor perform a method for persisting an instance of a data object, the method comprising:
    perform an operation on an instance of a data object;
    identify for the instance, at run-time, one of several persistence models that are available for the data object using the performed operation by determining an expectation of required functionality for the instance, each of the several persistence models defining how the data object is to be persisted in a database; and
    store the instance in the database according to the identified persistence model.

12. The computer program product of claim 11, wherein a first persistence model is identified for a first instance of the data object and a second persistence model, different from the first persistence model, is identified for a second instance of the data object.

13. The computer program product of claim 12, wherein the first persistence model defines that the first instance of the data object be stored in one table in the database.

14. The computer program product of claim 12, wherein the second persistence model defines that the second instance of the data object be stored in a plurality of tables in the database.

15. The computer program product of claim 11, wherein the identifying the one of several persistence models occurs transparent to a user.

16. The computer program product of claim 11, wherein the expectation of required functionality is determined by examining data in a table of the instance of the data object.

17. The computer program product of claim 11, wherein the data object is an email.

18. The computer program product of claim 11, wherein the instance is later stored according to another persistence model.

19. The computer program product of claim 11 wherein determining the expectation of required functionality for the instance of the data object comprises determining whether the instance of the data object includes a data structure associated with the object.

* * * * *